United States Patent
Kim

(10) Patent No.: US 11,143,290 B2
(45) Date of Patent: Oct. 12, 2021

(54) MOTOR POSITION LEARNING APPARATUS AND METHOD FOR ELECTRIC SHIFT-BY-WIRE SYSTEM

(71) Applicant: Hyundai Kefico Corporation, Gunpo-si (KR)

(72) Inventor: Min Ju Kim, Seoul (KR)

(73) Assignee: Hyundai Kefico Corporation, Gunpo-si (KR)

( * ) Notice: Subject to any disclaimer, the term of this patent is extended or adjusted under 35 U.S.C. 154(b) by 0 days.

(21) Appl. No.: 17/109,921

(22) Filed: Dec. 2, 2020

(65) Prior Publication Data
US 2021/0164560 A1 Jun. 3, 2021

(30) Foreign Application Priority Data
Dec. 3, 2019 (KR) .......................... 10-2019-0159285

(51) Int. Cl.
*F16H 61/32* (2006.01)
*F16H 59/10* (2006.01)

(52) U.S. Cl.
CPC .......... *F16H 59/105* (2013.01); *F16H 61/32* (2013.01)

(58) Field of Classification Search
CPC ... F16H 2061/326; F16H 59/105; F16H 61/32
See application file for complete search history.

(56) References Cited

U.S. PATENT DOCUMENTS

| | | | | |
|---|---|---|---|---|
| 2006/0103339 | A1* | 5/2006 | Yamada | F16H 61/32 318/623 |
| 2007/0044583 | A1* | 3/2007 | Hori | F16H 61/32 74/335 |
| 2016/0025214 | A1* | 1/2016 | Yoshida | F16H 63/48 701/45 |
| 2019/0190411 | A1* | 6/2019 | Kamio | H02P 27/06 |
| 2019/0195357 | A1* | 6/2019 | Kamio | F16H 61/32 |
| 2019/0203829 | A1* | 7/2019 | Sakaguchi | F16H 63/38 |
| 2019/0353242 | A1* | 11/2019 | Kamio | H02P 6/30 |
| 2019/0360581 | A1* | 11/2019 | Kamio | F16H 63/38 |
| 2019/0368602 | A1* | 12/2019 | Sakaguchi | F16H 61/28 |
| 2019/0383387 | A1* | 12/2019 | Kamio | H02P 6/16 |

(Continued)

FOREIGN PATENT DOCUMENTS

| | | |
|---|---|---|
| JP | 2002-048230 A | 2/2002 |
| JP | 2009-115219 A | 5/2009 |

(Continued)

*Primary Examiner* — David M Fenstermacher
(74) *Attorney, Agent, or Firm* — Morgan, Lewis & Bockius LLP

(57) ABSTRACT

Motor position learning method and apparatus for an electric shift-by-wire system are proposed. The method includes setting, as a first reference position, a motor position at a time point when shift is completed; driving the motor in opposite directions on the basis of the first reference position; measuring a rotation amount of the motor and a driving current flowing through the motor while the motor is driven in opposite directions; and calculating a rotation amount of the motor at a point where the driving current of the motor becomes minimum, and setting, as a second reference position, a position resulting after the motor rotates further by the calculated rotation amount from the first reference position.

8 Claims, 6 Drawing Sheets

(56) References Cited

U.S. PATENT DOCUMENTS

| | | | | |
|---|---|---|---|---|
| 2020/0011414 A1* | 1/2020 | Sakaguchi | ............... | H02P 3/18 |
| 2020/0263786 A1* | 8/2020 | Sakaguchi | ............. | H02P 25/22 |
| 2020/0370644 A1* | 11/2020 | Sakaguchi | ............. | F16H 61/32 |
| 2020/0378495 A1* | 12/2020 | Uchida | ................... | F16H 59/08 |
| 2020/0386307 A1* | 12/2020 | Miyano | .................. | F16H 63/38 |
| 2020/0400229 A1* | 12/2020 | Sakaguchi | ............. | F16H 61/12 |
| 2021/0071757 A1* | 3/2021 | Ogino | ................ | F16H 61/0204 |
| 2021/0180690 A1* | 6/2021 | Miyano | .................. | F16H 61/32 |
| 2021/0184613 A1* | 6/2021 | Sakaguchi | ............. | F16H 61/12 |
| 2021/0222773 A1* | 7/2021 | Nagata | .................. | F16H 61/32 |
| 2021/0262566 A1* | 8/2021 | Kawaguchi | ............ | F16H 61/12 |

FOREIGN PATENT DOCUMENTS

| | | |
|---|---|---|
| JP | 2015-096005 A | 5/2015 |
| KR | 10-1957513 B1 | 3/2019 |

\* cited by examiner

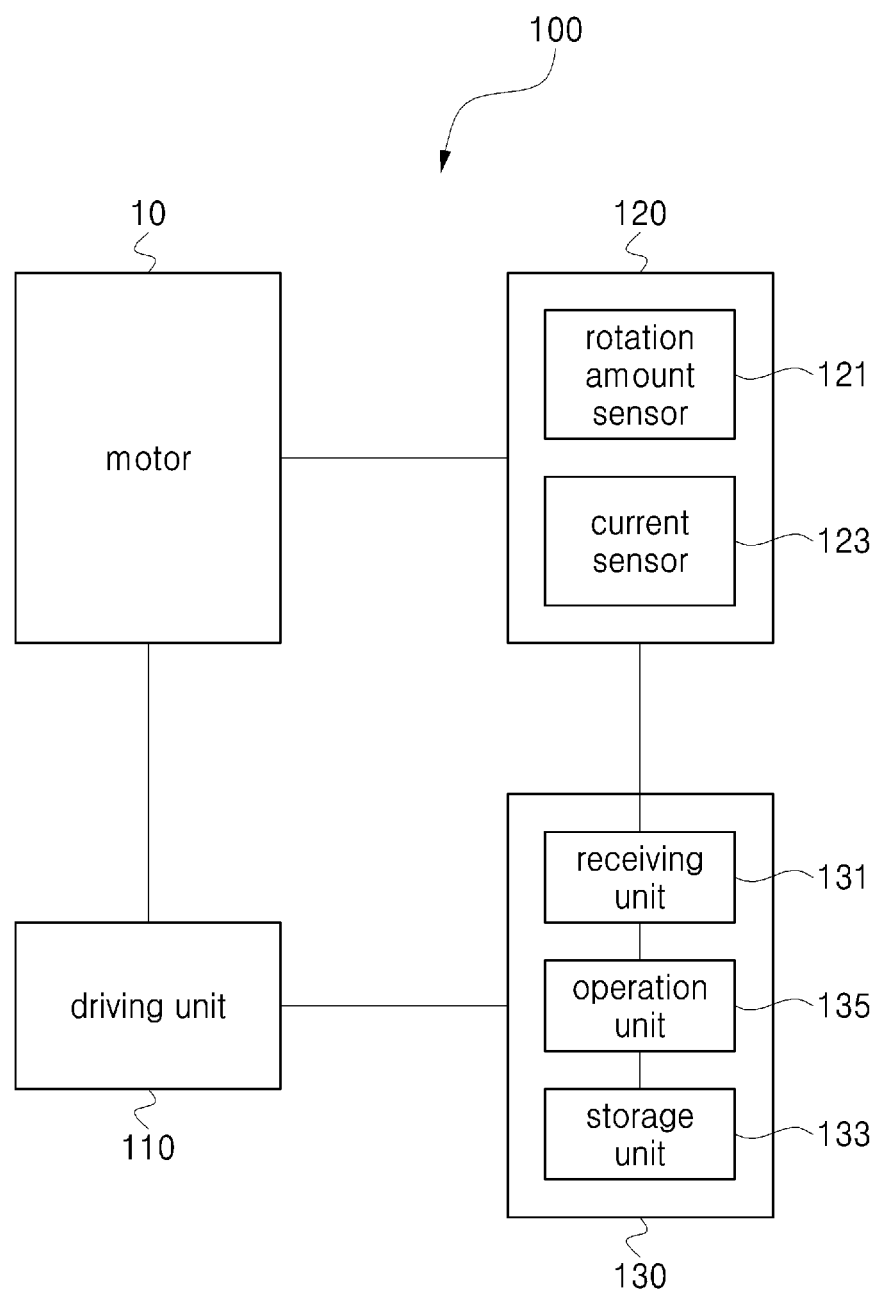

MOTOR POSITION LEARNING APPARATUS AND METHOD FOR ELECTRIC SHIFT-BY-WIRE SYSTEM

CROSS REFERENCE TO RELATED APPLICATIONS

The present application claims priority to Korean Patent Application No. 10-2019-0159285 filed on Dec. 3, 2019, the entire contents of which is incorporated herein for all purposes by this reference.

BACKGROUND OF THE INVENTION

Field of the Invention

The present disclosure relates to a motor position learning apparatus and method for an electric shift-by-wire system and, more specifically, to a motor position learning apparatus and method for an electric shift-by-wire system, the apparatus and method being configured to be capable of learning the gear shift position of the motor using only an inexpensive Hall sensor.

Description of the Related Art

Unlike a mechanical shift lever system that uses a mechanical link structure such as a wire, an electric shift-by-wire system performs shifting using an electric signal. Specifically, since the electric shift-by-wire system is configured to transmit shift lever operation information as an electric signal to rotate the motor, thereby switching a shift stage, and has a small shift shock and vibration, vehicles adopting the electric shift-by-wire system are gradually increasing.

The electric shift-by-wire system performs shifting using a detent spring and a detent plate connected to a motor. Specifically, when the motor is rotated, the detent plate connected to the motor also rotates along with the motor, and the detent spring moves from one root fillet to another formed in the detent plate, whereby the shift is performed.

However, due to the influence of magnetism by internal elements of the motor and the action of motor-driven torques by the gear configuration, the detent spring may not be positioned exactly at the root fillet of the detent plate. When such position errors are accumulated, serious problems such as shift stage deviation may occur. Therefore, it is necessary to continuously check and learn the reference position of the motor so that the detent spring may be accurately positioned at the root fillet of the detent plate.

Meanwhile, a method of checking the absolute position of the motor using a position sensor in the related art has been used. However, since a high-precision position sensor is expensive, there is a problem that the price competitiveness of the product is lowered.

SUMMARY OF THE INVENTION

The present disclosure has been made to solve the above problems, and it is an objective of the present disclosure to provide an apparatus and method of learning an exact gear shift position of a motor, by using properties that as the detent spring deviates from the root fillet of a detent plate, the restoring force of the detent spring increases, and as the restoring force of the detent spring increases, the motor's driving current required to rotate the detent plate also increases.

Particularly, the main objective of the present disclosure is to provide a motor position learning apparatus and method, which can learn an exact gear shift position of a motor by using a relatively inexpensive Hall sensor, instead of an expensive position sensor.

However, the objective of the present disclosures is not limited thereto, and may be variously expanded within a range not departing from the spirit and scope of the present disclosure.

In order to achieve the objective, a motor position learning method for an electric shift-by-wire system according to exemplary embodiments includes setting, as a first reference position, a motor position at a time point when shift is completed; driving the motor in opposite directions on the basis of the first reference position; measuring a rotation amount of the motor and a driving current flowing through the motor while the motor is driven in the opposite directions; and calculating a rotation amount of the motor at a point where the driving current of the motor becomes minimum, and setting, as a second reference position, a position resulting after the motor rotates further by the calculated rotation amount from the first reference position.

In the exemplary embodiments, the driving of the motor in the opposite directions may include driving the motor in the opposite directions at least twice on the basis of the first reference position, and the setting of the second reference position may include calculating rotation amounts of the motor, which correspond to respective multiple points where the driving current of the motor becomes minimum, calculating an average rotation amount of the calculated motor rotation amounts, and setting, as the second reference position, a position resulting after the motor rotates further by the calculated average rotation amount from the first reference position.

In the exemplary embodiments, the driving of the motor in the opposite directions may include driving the motor in the opposite directions within a range in which the shift stage is not changed.

In the exemplary embodiments, the measuring of the rotation amount of the motor may include measuring a relative rotation amount of the motor with respect to the first reference position.

In the exemplary embodiments, the setting of the first reference position may include setting, as the first reference position, a motor position at a time point when the shift is completed to a P stage or a Not P stage.

A motor position learning method for an electric shift-by-wire system according another embodiment of the present disclosure includes determining whether a shift stage change is completed; rotating the motor in opposite directions on the basis of a motor position at a time point when the shift stage change is completed; measuring a rotation amount of the motor and a driving current flowing through the motor; and calculating the rotation amount of the motor at a point where the measured driving current of the motor becomes minimum, and setting a reference position of the motor by correcting, by the calculated rotation amount, the motor position at the time point when the shift stage change is completed.

In the exemplary embodiments, the setting of the reference position of the motor may include calculating the rotation amounts of the motor, which correspond to respective points where the driving current of the motor becomes minimum, calculating an average rotation amount of the calculated rotation amounts of the motor, and setting the reference position of the motor by correcting, by the calculated average rotation amount, the motor position at the time point when the shift stage change is completed.

A motor position learning apparatus for an electric shift-by-wire system according another embodiment of the present disclosure includes a driving unit configured to rotate the motor in opposite directions by outputting a driving signal to the motor after shift is completed to a target shift stage; a measurement unit configured to measure a rotation amount of the motor and a driving current flowing through the motor; and a learning unit configured to calculate the rotation amount of the motor at a point where the driving current of the motor becomes minimum, and correct a predetermined reference position of the motor by the calculated rotation amount to reset the reference position of the motor.

In the exemplary embodiments, the driving unit may rotate the motor in opposite directions at least two times on the basis of the predetermined reference position of the motor. The learning unit may calculate rotation amounts of the motor, which correspond to respective points where the driving current of the motor becomes minimum, calculate an average rotation amount of the calculated rotation amount of the motor, and correcting the predetermined reference position of the motor by the calculated average rotation amount to reset the reference position of the motor.

In the exemplary embodiments, the measurement unit may measure a relative rotation amount of the motor with respect to the predetermined reference position of the motor.

In the exemplary embodiments, the driving unit may rotate the motor within a range in which the shift stage is not changed.

In the exemplary embodiments, the target shift stage may include a P stage and a Not P stage.

The motor position learning apparatus and method for an electric shift-by-wire system according to embodiments of the present disclosure has an advantage that it is possible to learn the reference gear shift position of the motor by using a relatively inexpensive sensor. In addition, since the position learning can be performed within a relatively short period of time without changing the shift stage, the position learning can be efficiently performed even when the vehicle is not in the parking stage (P stage). Accordingly, it is possible to improve the price competitiveness of the product and secure the reliability of the shift control.

BRIEF DESCRIPTION OF THE DRAWINGS

The above and other objectives, features, and other advantages of the present disclosure will be more clearly understood from the following detailed description when taken in conjunction with the accompanying drawings, in which:

FIG. 3 is a block diagram showing a motor position learning apparatus for the electric shift-by-wire system according to the present disclosure;

DETAILED DESCRIPTION OF THE INVENTION

Figure 1:
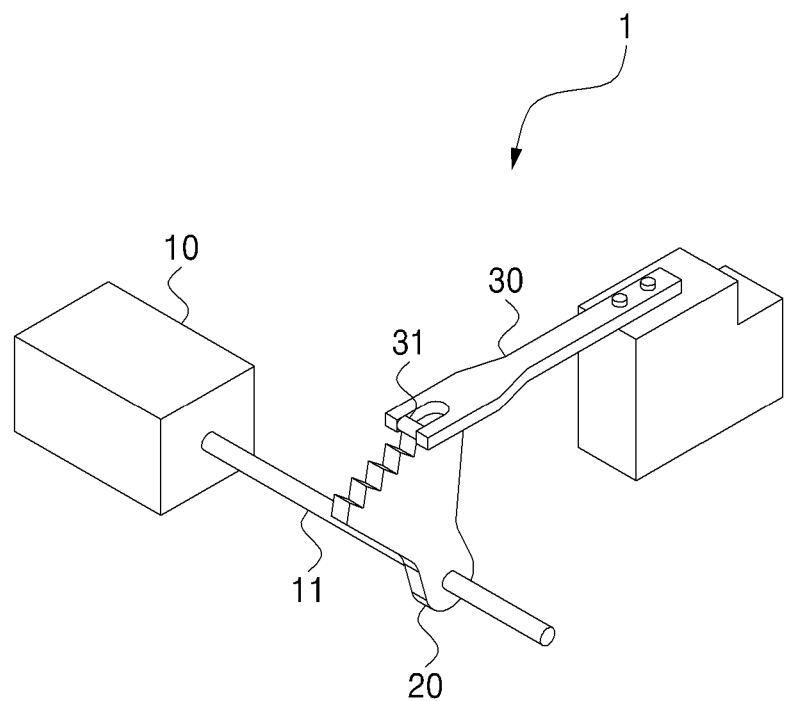
FIG. 1 is a perspective view showing an electric shift-by-wire system.

Specific structural or functional descriptions in embodiments of the present disclosure disclosed herein are exemplified only for the purpose of describing the embodiments of the present disclosure, and the embodiments of the present disclosure can be implemented in various forms and should not be construed as being limited to the embodiments described in the specification.

Since the present disclosure can apply various changes and have various forms, specific embodiments will be illustrated in the drawings and described in detail in the description. However, it is to be understood that the description is not intended to limit the present disclosure to a specific form of disclosure, but includes all changes, equivalents, and substitutes included in the spirit and scope of the present disclosure.

Although terms such as first and second may be used to describe various elements, the components should not be limited by the terms. The terms may be used for the purpose of distinguishing one component from another component. For example, without departing from the scope of the present disclosure, a first component may be referred to as a second component, and similarly, the second component may also be referred to as the first component.

It should be understood that, when a constituent element is referred to as being "coupled to" or "connected to" a different constituent element, this means that the constituent element may be coupled to or connected to the different constituent element or means that an intervening constituent element may be present therebetween. In contrast, it should be understood that, when a constituent element is referred to as being "directly coupled to" or "directly connected to" a different constituent element, this means that no intervening constituent element is present therebetween. Expressions describing a relationship between constituent elements, such as "between" and "directly between", and "adjacent to" and "directly adjacent to", should be construed in the same manner.

The terms used in the present specification are only used to describe specific embodiments, and are not intended to limit the present disclosure. Singular expressions include plural expressions unless the context clearly indicates otherwise. In the present specification, it is to be understood that terms such as "comprise" or "have" are intended to designate the existence of the specified features, numbers, steps, actions, components, parts, or combinations thereof, and the possibility of the presence or addition of one or more other features or numbers, steps, actions, elements, parts, or combinations thereof is not preliminarily excluded.

Unless otherwise defined, all terms used herein, including technical or scientific terms, have the same meaning as commonly understood by one of ordinary skill in the art to which the present disclosure belongs. Terms such as those defined in commonly used dictionaries should be interpreted as having a meaning consistent with the meaning in the context of the related art, and unless explicitly defined in the present specification, the terms should not be interpreted in an ideal or excessively formal meaning.

Hereinafter, preferred embodiments of the present disclosure will be described in more detail with reference to the accompanying drawings. The same reference numerals are used for the same elements in the drawings, and duplicate descriptions for the same elements are omitted.

First, an electric shift-by-wire system will be described with reference to FIGS. 1 and 2.

Figure 2A:
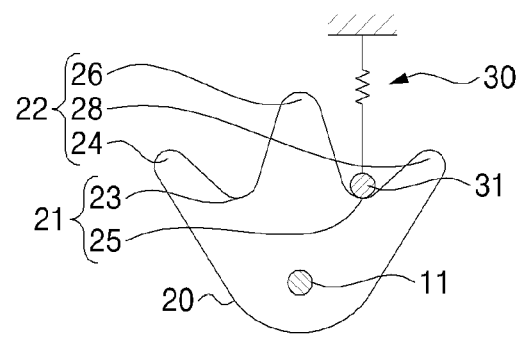
FIG. 2A, FIG. 2B, and FIG. 2C are views showing operations of a detent spring according to rotation of a detent plate.
Figure 2B:
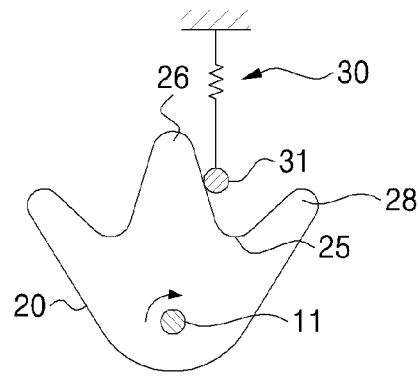
Figure 2C:
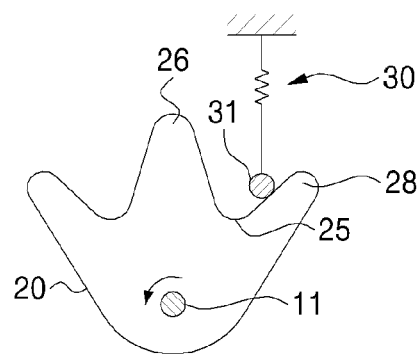

FIG. 1 is a perspective view showing an electric shift-by-wire system; and FIGS. 2A, 2B, and 2C are views showing operations of a detent spring according to rotation of a detent plate.

Referring to FIGS. 1, 2A, 2B and 2C, the electric shift-by-wire system 1 includes a motor 10 that controls a shift stage, and a detent plate 20 and a detent spring 30 provided to change the shift stage according to driving of the motor 10.

When a driver operates a shift lever (not shown) to a specific position, an electric signal corresponding to the position may be transmitted to the motor 10. The motor 10 may rotate in a forward direction or in a reverse direction according to the received electric signal.

The detent plate 20 may be connected to the motor 10 through a rotation shaft 11. Therefore, the rotation of the motor 10 may be transmitted to the detent plate 20 through the rotation shaft 11. The detent plate 20 may also rotate in the same direction as the motor 10 rotates.

As shown in FIG. 2A, the detent plate 20 may have a plurality of root fillets 21 and a plurality of top lands 22. Each root fillet 21 is a position at which a roller 31 of the detent spring 30 is seated, and a specific shift stage may correspond to each root fillet 21. Therefore, as the roller 31 moves from one root fillet to another, the shift stage may be changed.

For example, the detent plate 20 may have two root fillets 21 and three top lands 22 as shown in FIG. 2A. Specifically, the detent plate 20 may have a first root fillet 23 and a second root fillet 25, and first to third top lands 24, 26, and 28. Herein, the first root fillet 23 may correspond to a P stage, and the second root fillet 25 may correspond to a Not P stage. When the driver operates to switch the shift lever from the P stage to the Not P stage, the motor 10 and the detent plate 20 rotate, so that the roller 31 may move from the first root fillet 23 to the second root fillet 25.

Meanwhile, although a detent plate 20 having two root fillets 21 is shown in FIG. 2A, the present disclosure is not limited only to a two-stage detent plate. For example, even when the detent plate 20 has a total of four root fillets including a P stage, an R stage, an N stage, and a D stage, the present disclosure may be applied equally. For convenience of explanation, only the case where the detent plate 20 has two root fillets 21 will be described hereinafter.

The detent spring 30 is a plate-shaped elastic member having elastic force, and is provided to have a roller 31 provided at one end and to be fixed at the other end. When the motor 10 and the detent plate 20 rotate, the roller 31 may move along the root fillet 21 and the top land 22 of the detent plate 20. For example, when switching the shift lever from the Not P stage to the P stage, as the detent plate 20 rotates clockwise, the roller 31 may move from the second root fillet 25 to the second top land 26, as shown in FIG. 2B. In contrast, when the detent plate 20 rotates counterclockwise, the roller 31 may move from the second root fillet 25 to the third top land 28, as shown in FIG. 2C.

Meanwhile, the detent spring 30 is an elastic member and thus has elastic restoring force. The elastic restoring force may have the lowest value when the roller 31 is positioned at the root fillet 21, and have a maximum value when the roller 31 is positioned at the top land 22. Accordingly, the required current for driving the motor 10 may be minimum when the roller 31 is correctly seated in the root fillet 21 (FIG. 2A). According to the present disclosure, it is possible to learn the gear shift position of the motor by using such principle. Hereinafter, the motor position learning apparatus according to the present disclosure will be described in detail.

Figure 4:
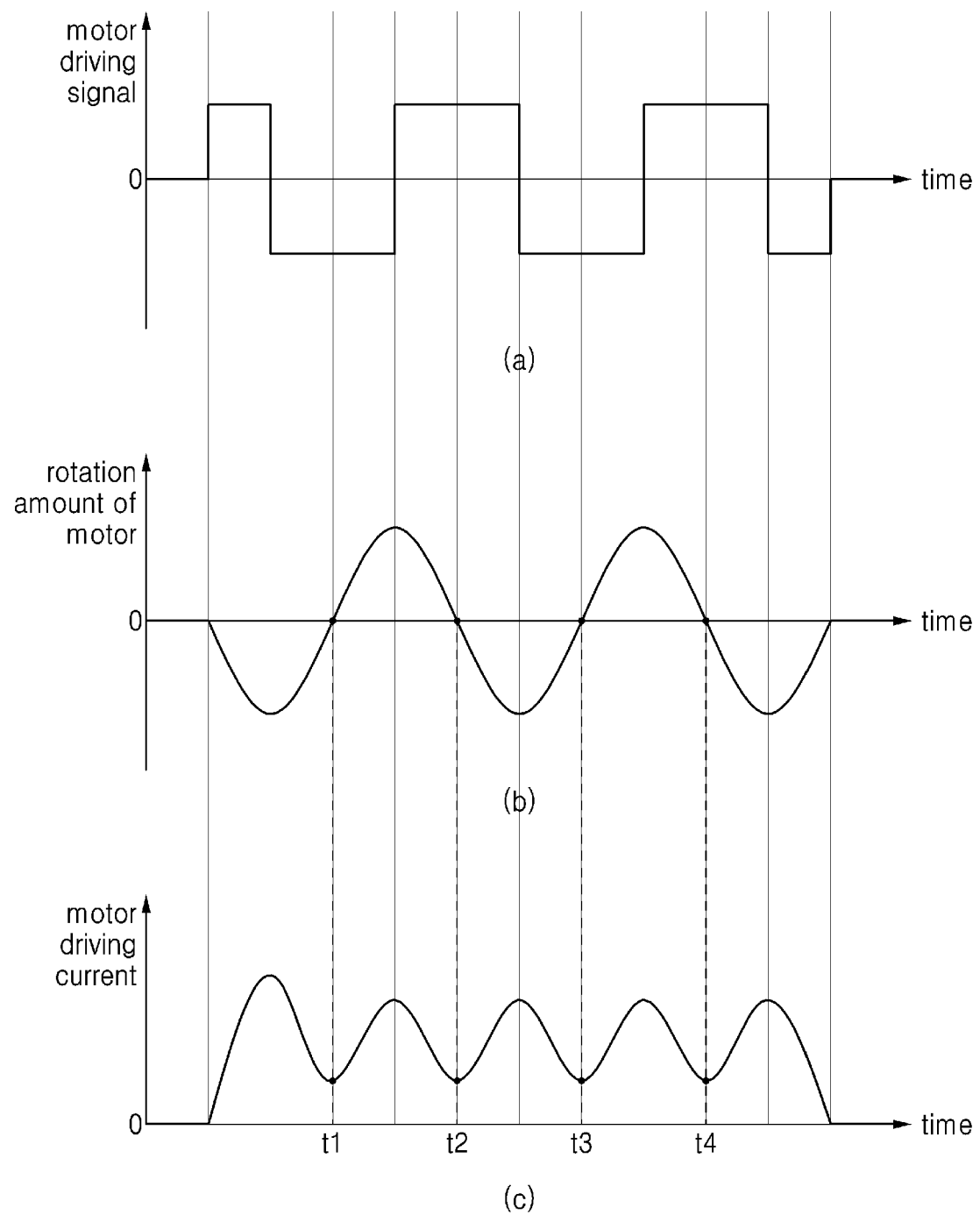
FIG. 4 and FIG. 5 are graphs showing a process of learning the gear shift position of a motor using the motor position learning apparatus of FIG. 3.
Figure 5:
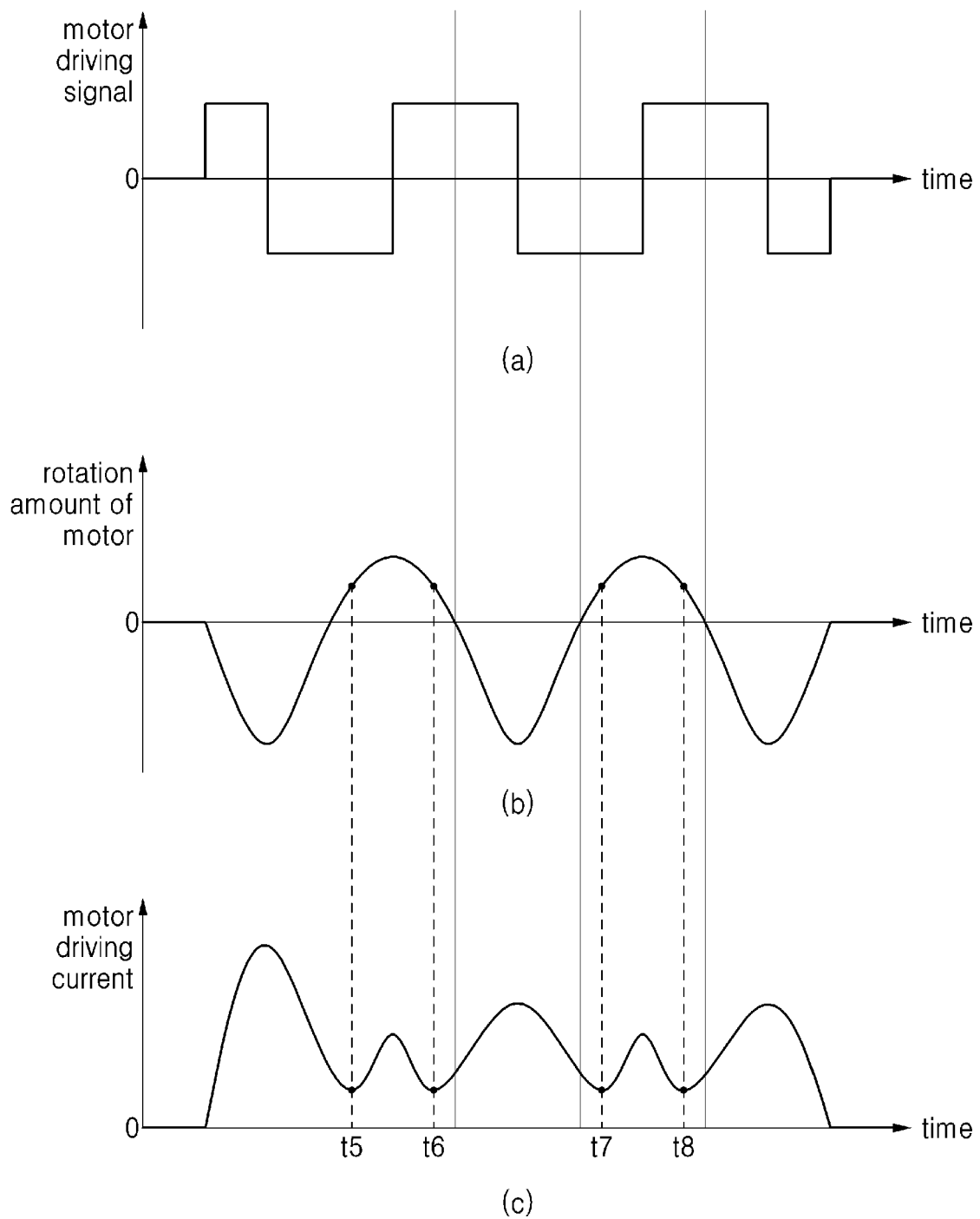

FIG. 3 is a block diagram showing a motor position learning apparatus for an electric shift-by-wire system according to the present disclosure. FIGS. 4 and 5 are graphs illustrating a process of learning the gear shift position of a motor using the motor position learning apparatus of FIG. 3.

Referring to FIG. 3, the motor position learning apparatus 100 for the electric shift-by-wire system includes a driving unit 110 outputting a driving signal to the motor 10, a measurement unit 120 measuring a rotation amount and driving current of the motor 10, and a learning unit 130 learning the reference position of the motor 10, the reference position corresponding to a specific shift stage using the measured information.

The driving unit 110 may rotate the motor 10 in a forward or in a reverse direction by outputting the driving signal to the motor 10.

When the driver changes the shift stage, the motor 10 may stop driving after rotating to the reference position stored in the storage unit 133.

After the shift is completed, the driving unit 110 may drive the motor 10 in opposite directions by outputting the driving signal to the motor 10, as shown in (a) of FIG. 4 and (a) of FIG. 5. Herein, a zero driving signal may be a signal that does not drive the motor 10; a positive driving signal may be a signal that drives the motor 10 so that the output shaft 11 and the detent plate 20 rotate clockwise as shown in FIG. 2B; and a negative driving signal may be a signal that drives the motor 10 so that the output shaft 11 and the detent plate 20 rotate in a counterclockwise direction as shown in FIG. 2C. For convenience of explanation, in the case of the positive driving signal, it is noted that the motor 10 drives in a forward direction, and in the case of the negative driving signal, it is noted that the motor 10 drives in a reverse direction.

The driving unit 110 may drive the motor 10 alternately in opposite directions on the basis of the gear shift position of the motor 10 when the shift is completed. Herein, the rotation amount and the number of times of repeating the driving in opposite directions for the motor 10 may be appropriately selected as necessary. However, since there is a risk of an accident when the shift stage is changed differently from a driver's intention, it is preferable to rotate the motor 10 only within a range in which the shift stage is not changed. In addition, in order to secure the reliability of the reference position, it is preferable to repeat the driving in opposite directions at least two times.

The measurement unit 120 may include a rotation amount sensor 121 and a current sensor 123.

The rotation amount sensor 121 may measure the rotation amount of the motor 10 and transmit the same to the learning unit 130. For example, the rotation amount sensor 121 may be a Hall sensor. The Hall sensor may count the moments when the rotation shaft 11 of the motor 10 passes through a Hall element to measure a relative rotation amount of the motor 10. Information on the measured rotation amount of the motor 10 may be provided to the learning unit 130.

For example, changes in the rotation amount of the motor 10, measured by the rotation amount sensor 121, are shown in (b) of FIG. 4 and (b) of FIG. 5. Herein, decreasing the rotation amount of the motor 10 means that the motor 10 rotates in a forward direction on the basis of the position at which the shift is completed for the motor 10, and increasing the rotation amount of the motor 10 means that the motor 10 rotates in a reverse direction on the basis of the position at which the shift is completed for the motor 10. That is, the motor 10 may rotate in opposite directions on the basis of the position at which the shift is completed as the driving signal is output from the driving unit 110. The rotation amount sensor 121 may monitor a change in the rotation amount of the motor 10 according to the application of the driving signal on the basis of the position at a time point when the shift is completed for the motor 10.

The current sensor 123 may measure a driving current applied to the motor 10 and transmit the same to the learning unit 130. Specifically, when the driving unit 110 transmits the driving signal to the motor 10, the motor 10 may rotate in one direction. Herein, the driving current is required to rotate the motor 10, and the higher external force acting on the motor 10, such as the elastic restoring force of the detent spring 30, the larger current required to drive the motor 10. The current sensor 123 may measure a magnitude of the driving current applied to the motor 10 when the motor 10 rotates and provide the same to the learning unit 130.

For example, changes in the driving current of the motor 10, measured by the current sensor 123, are shown in (c) of FIG. 4 and (c) of FIG. 5. As shown, the driving current may have a sinusoidal shape.

The learning unit 130 may include a receiving unit 131, an operation unit 135, and a storage unit 133.

The receiving unit 131 may receive information measured from the measurement unit 120. Specifically, the receiving unit 131 may receive information on the rotation amount of the motor 10 from the rotation amount sensor 121 and may receive information on the driving current applied to the motor 10 from the current sensor 123. The receiving unit 131 may transfer the information to the calculating unit 135.

The storage unit 133 may store information on the reference position of the motor 10, which corresponds to each shift stage. When the driver switches the shift stage using the shift lever, the motor 10 may rotate to the reference position stored in the storage unit 133. Meanwhile, when the operation unit 135 calculates a new reference position through reference position learning, which will be described later, the new reference position is provided to the storage unit 133, and then the storage unit 133 may update the reference position information.

The operation unit 135 may learn the reference position of the motor 10 by using information on the rotation amount of the motor 10 and the driving current of the motor 10.

Specifically, the operation unit 135 may determine a minimum point at which the driving current of the motor 10 becomes minimum, and calculate a rotation amount of the motor 10 at the minimum point. Thereafter, the operation unit 135 may set a new reference position by reflecting the rotation amount of the motor 10 at the minimum point on the existing reference position stored in the storage unit 133. That is, when the rotation amount of the motor 10, which corresponds to the point at which the driving current of the motor 10 becomes minimum, is zero, it is determined that there is no error in the existing reference position, so that the existing reference position may not be updated. Alternatively, when the rotation amount of the motor 10, which corresponds to the point at which the driving current of the motor 10 becomes minimum, is not zero, it is determined that there is an error in the existing reference position information, so that a point after the motor 10 rotates further by the rotation amount may be set as a new reference position.

Meanwhile, as shown in (c) of FIG. 4 and (c) of FIG. 5, when there are a plurality of minimum points at which the driving current of the motor 10 becomes minimum, the average value of the rotation amounts corresponding to the respective minimum points is calculated, and then a point resulting after the motor rotates further by the calculated average rotation amount may be set as a new reference position of the motor 10.

For example, in the case of FIG. 4, there are a total of four points t1, t2, t3, and t4 at which the driving current of the motor 10 becomes minimum. The rotation amounts of the motor 10, which correspond to the respective four points t1, t2, t3, and t4 are all equal to zero. Therefore, the operation unit 135 may determine that there is no error in the existing reference position stored in the storage unit 133 and may not update the existing reference position.

In contrast, as shown in FIG. 5, there are a total of four points t5, t6, t7, and t8 at which the driving current of the motor 10 becomes minimum, and the rotation amounts of the motor 10, which correspond to the respective four points t5, t6, t7, and t8 are not zero, the existing reference position may be updated. Specifically, an average value of the rotation amounts of the motor 10, which correspond to the respective four points t5, t6, t7, and t8, is calculated, and a point resulting after the motor rotates further by the calculated average rotation amount may be set as a new reference position of the motor 10. In FIG. 5, since the calculated average rotation amount is a positive value, a position at which the motor 10 is rotated in the reverse direction by the average rotation amount may be set as a new reference position.

The operation unit 135 may provide information on the new reference position to the storage unit 133, and the storage unit 133 may update the reference position information. Meanwhile, when the position of one shift stage is determined, the positions of the other shift stages may also be easily calculated using specifications of the detent plate 20 and the motor 10. Accordingly, when the reference position of the motor 10 with respect to one shift stage is updated, the reference positions of the motor 10 with respect to the other shift stages may also be updated.

The driving unit 110 rotates the motor 10 to the updated reference position, and the learning logic may be terminated. Thereafter, when the driver selects the shift lever to the corresponding shift stage, the motor 10 may rotate to the updated reference position. Accordingly, it is possible to ensure the reliability of the shift control.

As described above, the motor position learning apparatus 100 of the electric shift-by-wire system according to the present disclosure may learn the reference position of the motor for the shift stage using only a relatively inexpensive sensor. Accordingly, the reliability of the shift control can be secured, and the price competitiveness of the product can be improved.

Figure 6:
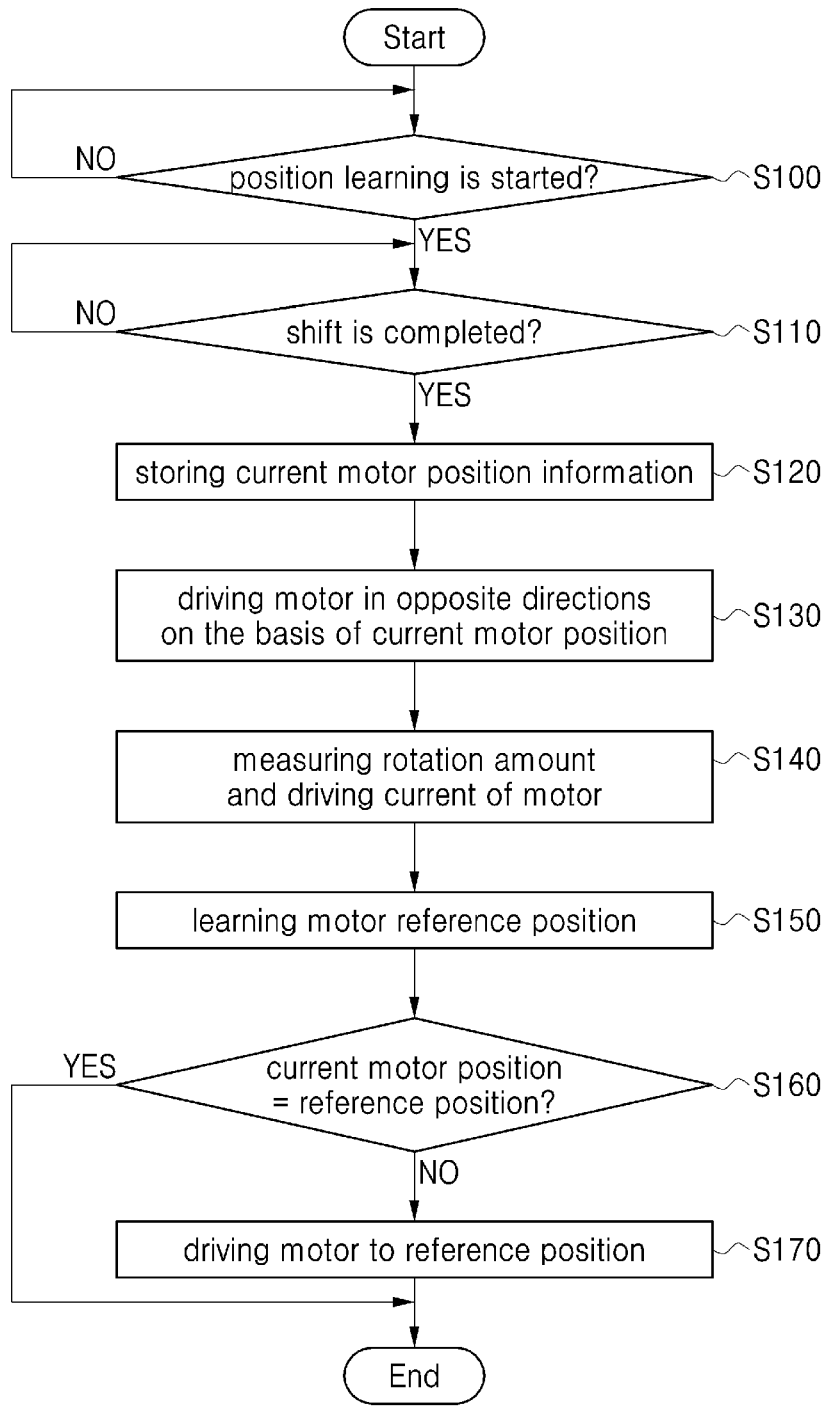
FIG. 6 is a flowchart showing a method of learning the gear shift position of a motor using the motor position learning apparatus of FIG. 3.

FIG. 6 is a flowchart showing a method of learning the gear shift position of a motor using the motor position learning apparatus of FIG. 3. Hereinafter, the method of learning the reference position of a motor using the motor position learning apparatus 100 of FIG. 3 will be described in more detail with reference to FIG. 6.

First, it is determined whether to learn the gear shift position of the motor (S100).

According to the present disclosure, it is possible to learn the position while driving the motor 10 by a predetermined angle in opposite directions on the basis of the shift completion point. Herein, since the amount (rotation angle) by which the motor 10 drives is predetermined so that the shift stage does not change, the shift stage does not change during performing the position learning. However, since the shift stage may be changed again during performing the position learning when the vehicle is in driving operation, or the gear position may change during the position learning due to unexpected causes, it is not preferable to perform the position learning while the vehicle is in driving operation. Therefore, it is determined first whether it is possible to perform the position learning.

For example, when the target shift stage is a parking stage (P stage), it is possible to perform the position learning for the motor 10. This is because there is no fear that the shift stage will change again during performing the position learning when the target gear position is the P stage. In this case, it may be set so that the position learning is performed for the motor 10 whenever the target shift stage is changed to the P stage, or it may be set so that the position learning is performed at a predetermined period of time, for example, once a month. Such a period at which the position learning is performed may be appropriately selected as needed.

However, since the motor position learning method according to the present disclosure can be performed within a relatively short period of time without changing the shift stage, it has an advantage that the position learning can be performed at any time after the shift is completed even when the target shift stage is not the P stage.

Alternatively, the position learning may be performed for the motor 10 only when a separate user input is applied. For example, a location learning performance button is provided on a user interface connected to an electronic control unit (ECU), so that the position learning may be performed for the motor 10 only when a user presses the button.

When it is determined that the position learning is performed for the motor 10, after the shift is completed (S110), the position of the motor 10 is stored at a time point when the shift is completed (S120). Typically, since the motor 10 will rotate to a pre-stored reference position, the position of the motor 10 at the time point when the shift is completed may be the existing reference position.

On the basis of the existing reference position, the motor 10 is driven in opposite directions, by a predetermined angle, a predetermined number of times (S130).

For example, the driving unit 110 may drive the motor 10 by applying a driving signal to the motor 10. Herein, the predetermined angle and the predetermined number of times may be appropriately selected as necessary. However, as described above, in order to secure the safety, the predetermined angle may be an angle that allows the shift stage not to be changed. In addition, in order to secure the reliability of location learning, the predetermined number of times may be at least two.

While the motor 10 is driven in opposite directions, the rotation amount of the motor 10 and the magnitude of the driving current flowing through the motor 10 are measured (S140).

For example, the rotation amount of the motor 10 may be measured by the rotation amount sensor 121, and the driving current of the motor 10 may be measured by the current sensor 123. Herein, the rotation amount of the motor 10 may be a rotation amount relative to the existing reference position. Therefore, the rotation amount sensor 121 does not need to be an expensive absolute position sensor, and may be used with a Hall sensor or the like, which is relatively inexpensive.

The reference position of the motor 10 is learned by using the measured rotational amount and driving current of the motor 10 (S150).

Specifically, the reception unit 131 may receive information measured from the rotation amount sensor 121 and the current sensor 123 and transmit the information to the operation unit 135. The operation unit 135 calculates the reference position of the motor 10 using the received information and compares the same with the existing reference position previously stored in the storage unit 133, thereby performing the position learning.

For example, when the rotation amount of the motor 10 is zero at the point where the driving current of the motor 10 become minimum, it is determined that there is no error in the existing reference position, so that the existing reference position may not be updated.

In contrast, when the rotation amount of the motor 10 is not zero at the point where the driving current of the motor 10 becomes minimum, it is determined that there is an error in the existing reference position, so that a point resulting after the motor 10 rotates further by the rotation amount may be set as a new reference position. The new reference position information may be transferred to the storage unit 133 to replace the existing reference position information.

Meanwhile, when the predetermined number of times is plural, that is, when the motor 10 is driven two or more times in opposite directions on the basis of the existing reference position, there may be a plurality of points where the driving current of the motor 10 becomes minimum. Herein, the rotation amounts of the motor 10 corresponding to the respective minimum points are calculated, and a new reference position may be set by using an average value of the calculated rotation amounts. That is, a point resulting after the motor 10 rotates more by the average rotation amount from the existing reference position may be set as the new reference position. Information on the new reference position may be transferred to the storage unit 133 to replace the existing reference position information.

When the reference position information of the motor 10 is not updated (S160), the position learning is completed. When the reference location information has been updated, the motor 10 is moved to the new reference position (S170), thereby terminating the position learning.

As described above, the motor position learning apparatus and method for an electric shift-by-wire system according to the present disclosure has an advantage that it is possible to learn the motor reference position for the shift stage by using only a relatively inexpensive sensor. In addition, since the position learning can be performed within a relatively short period of time without changing the shift stage, the position learning can be performed even when the vehicle is not in the parking stage (P stage). Accordingly, it is possible to improve the price competitiveness of the product and secure the reliability of the shift control.

Although the above has been described with reference to embodiments of the present disclosure, it will be appreciated that those skilled in the art will be able to variously modify and change the present disclosure without departing from the spirit and scope of the present disclosure described in the following claims.

The invention claimed is:

1. A motor position learning method for an electric shift-by-wire system that rotates a motor to change a shift stage, the method comprising:
    setting, as a first reference position, a motor position at a time point when shift is completed;
    driving the motor in opposite directions on the basis of the first reference position;
    measuring a rotation amount of the motor and a driving current flowing through the motor while the motor is driven in the opposite directions; and
    calculating a rotation amount of the motor at a point where the driving current of the motor becomes minimum, and setting, as a second reference position, a position resulting after the motor rotates further by the calculated rotation amount from the first reference position.

2. The method of claim 1, wherein the driving of the motor in the opposite directions comprises driving the motor in the opposite directions at least twice on the basis of the first reference position,
wherein the setting of the second reference position comprises:
calculating rotation amounts of the motor, which correspond to respective multiple points where the driving current of the motor becomes minimum,
calculating an average rotation amount of the calculated motor rotation amounts, and
setting, as the second reference position, a position resulting after the motor rotates further by the calculated average rotation amount from the first reference position.

3. The method of claim 1, wherein the driving of the motor in the opposite directions comprises driving the motor in the opposite directions within a range in which the shift stage is not changed.

4. The method of claim 1, wherein the measuring of the rotation amount of the motor comprises measuring a relative rotation amount of the motor with respect to the first reference position.

5. The method of claim 1, wherein the setting of the first reference position comprises setting, as the first reference position, a motor position at a time point when the shift is completed to a P stage or a Not P stage.

6. A motor position learning method for an electric shift-by-wire system that rotates a motor to change a shift stage, the method comprising:
determining whether a shift stage change is completed;
rotating the motor in opposite directions on the basis of a motor position at a time point when the shift stage change is completed;
measuring a rotation amount of the motor and a driving current flowing through the motor; and
calculating the rotation amount of the motor at a point where the measured driving current of the motor becomes minimum, and setting a reference position of the motor by correcting, by the calculated rotation amount, the motor position at the time point when the shift stage change is completed.

7. The method of claim 6, wherein the setting of the reference position of the motor comprises:
calculating the rotation amounts of the motor, which correspond to respective points where the driving current of the motor becomes minimum,
calculating an average rotation amount of the calculated rotation amounts of the motor, and
setting the reference position of the motor by correcting, by the calculated average rotation amount, the motor position at the time point when the shift stage change is completed.

8. A motor position learning apparatus for an electric shift-by-wire system that rotates a motor to change a shift stage, the apparatus comprising:
a driving unit configured to rotate the motor in opposite directions by outputting a driving signal to the motor after shift is completed to a target shift stage;
a measurement unit configured to measure a rotation amount of the motor and a driving current flowing through the motor; and
a learning unit configured to calculate the rotation amount of the motor at a point where the driving current of the motor becomes minimum, and correct a predetermined reference position of the motor by the calculated rotation amount to reset the reference position of the motor.

* * * * *